(12) United States Patent
Daiss et al.

(10) Patent No.: US 7,271,711 B2
(45) Date of Patent: Sep. 18, 2007

(54) DEVICE AND METHOD FOR DETERMINING A WHEEL POSITION

(75) Inventors: Armin Daiss, Wenzenbach (DE); Frank Fischer, Regensburg (DE); Herbert Froitzheim, Pettendorf (DE); Stefan Hammes, Regensburg (DE); Gregor Kuchler, Thalmassing (DE)

(73) Assignee: Siemens AG, Munich (DE)

( * ) Notice: Subject to any disclaimer, the term of this patent is extended or adjusted under 35 U.S.C. 154(b) by 243 days.

(21) Appl. No.: 11/175,648

(22) Filed: Jul. 6, 2005

(65) Prior Publication Data

US 2006/0006992 A1    Jan. 12, 2006

(30) Foreign Application Priority Data

Jul. 6, 2004    (DE)    ............. 10 2004 032 698

(51) Int. Cl.
*B60C 23/00*    (2006.01)
(52) U.S. Cl. ............... 340/447; 73/146.5; 340/442; 340/445
(58) Field of Classification Search ........... 340/442, 340/443, 444, 445, 446, 447, 686.1; 73/146.5; 702/150
See application file for complete search history.

(56) References Cited

U.S. PATENT DOCUMENTS

| | | | |
|---|---|---|---|
| 5,774,047 A * | 6/1998 | Hensel, IV | 340/442 |
| 5,880,363 A | 3/1999 | Meyer et al. | |
| 6,112,585 A | 9/2000 | Schrottle et al. | |
| 6,181,241 B1 | 1/2001 | Normann et al. | |
| 6,446,502 B1 | 9/2002 | Normann et al. | |
| 6,489,888 B1 * | 12/2002 | Honeck et al. | 340/442 |
| 6,871,157 B2 * | 3/2005 | Lefaure | 702/150 |
| 6,885,282 B2 * | 4/2005 | Desai et al. | 340/5.61 |
| 6,927,679 B2 | 8/2005 | Taguchi et al. | |
| 6,945,087 B2 * | 9/2005 | Porter et al. | 73/1.57 |
| 2002/0149477 A1 | 10/2002 | Desai et al. | |
| 2003/0179082 A1 | 9/2003 | Ide | |
| 2003/0179086 A1 * | 9/2003 | Nantz et al. | 340/445 |
| 2004/0113765 A1 | 6/2004 | Suitsu | |
| 2005/0099282 A1 | 5/2005 | Taguchi et al. | |

FOREIGN PATENT DOCUMENTS

| | | |
|---|---|---|
| DE | 196 08 479 A1 | 5/1997 |
| DE | 103 11 364 A1 | 10/2003 |
| DE | 102 26 995 A1 | 5/2004 |
| EP | 0 763 437 B1 | 3/1997 |
| EP | 1 003 647 B1 | 5/2000 |
| EP | 1 428 694 A2 | 6/2004 |
| JP | 2004032331 A | 1/2004 |

\* cited by examiner

*Primary Examiner*—Brent A. Swarthout
(74) *Attorney, Agent, or Firm*—Laurence A. Greenberg; Werner H. Stemer; Ralph E. Locher

(57) ABSTRACT

A device and a method for determining a wheel position on a vehicle, for example an automobile. Long-wave antennae of a vehicle access system already present in the vehicle transmit a signal, which is measured by a long-wave receive unit of a tire electronic system and used to detect the position of the wheel on the vehicle. The electrical or magnetic receive field strength of the signal of a specific long-wave antenna for example is in particular detected by a tire electronic system and used to determine the position of the wheel on the vehicle.

15 Claims, 2 Drawing Sheets

DEVICE AND METHOD FOR DETERMINING A WHEEL POSITION

BACKGROUND OF THE INVENTION

Field of the Invention

The invention relates to a device and a method for determining a wheel position.

In the case of direct-measurement tire pressure control systems, a wheel-mounted or tire-mounted electronic system communicates with a receive and evaluation unit mounted permanently in the vehicle. Wheel electronic systems instantaneously detect acceleration as well as pressure and temperature at regular time intervals. The evaluation unit receives data transmissions and assigns them to a specific wheel electronic system by use of an identification code also sent at the same time. It would be possible to deduce a specific wheel position on the vehicle from the identification code, e.g. "front left". But this type of position determination assumes that the wheel positions do not change, for example after a tire change. If an old wheel is replaced with a new wheel, it must also be ensured that the wheel electronic system of the new wheel is set according to the intended position of the wheel on the vehicle. This requires the wheel electronic system to be programmed accordingly.

Such methods for determining the position of a wheel are generally known as location methods. Some location methods and devices are described briefly below.

European Patent EP 1 003 647 B1 describes the possibility of left/right location of a wheel using acceleration sensors. The sign before the acceleration measured in the wheel thereby indicates the vehicle side. However this requires a separate acceleration sensor, thereby incurring additional cost. Other methods with acceleration sensors require a specific drive or route profile for left/right location. This results in long convergence times.

With another procedure, the field strength of a radio telegram transmitted by a wheel electronic system and received by the vehicle is analyzed. European Patent EP 763 437 B1 discloses a system, with which the field strength of the radio telegram is analyzed using four antennae, each mounted in proximity to a wheel. The location of the antenna with the highest measured field strength identifies the wheel from which the telegram originates. However antenna installation involves a high level of outlay.

A so-called trigger antennae can also be used to determine the position of a wheel. U.S. Pat. No. 5,880,363 describes a system, in which a long-wave signal is used to activate just one wheel electronic system to emit a data telegram with a specific identification signal. Cyclical activation of all the wheel positions allows the identification codes of the assigned wheel electronic systems to be acquired. The long-wave antennae required specifically for this purpose on the vehicle and the long-wave receive units on the wheels however incur additional cost.

SUMMARY OF THE INVENTION

It is accordingly an object of the invention to provide a device and a method for determining a wheel position, which overcomes the above-mentioned disadvantages of the prior art devices and methods of this general type, which requires the smallest possible technical outlay.

With the foregoing and other objects in view there is provided, in accordance with the invention, a device for determining a position of a wheel on a vehicle. The device contains an evaluation unit, and a tire electronic system disposed on the wheel for measuring a tire status variable and wirelessly transmitting measured tire status variables to the evaluation unit. The tire electronic system has a long-wave receive unit and is configured for enhancing a receive response of the long-wave receive unit for a predefined time window on transmission of a message with a tire status variable. At least one long-wave antenna of a vehicle access system is disposed in the vehicle. A control device is provided in the vehicle and is configured to activate the long-wave antenna. The control device is activated by the evaluation unit for transmitting a signal via the at least one long-wave antenna. The signal is intended for the long-wave receive unit in the wheel. The evaluation unit is configured for sending a start signal to the control device on receipt of the message with the tire status variable, to transmit the signal intended for the long-wave receive unit. The long-wave receive unit is configured to transmit a response signal wirelessly to the evaluation unit on receipt of the signal. The evaluation unit is further configured for determining a position of the wheel of the vehicle based on the response signal.

An important idea of the invention is to use the long-wave antennae of a vehicle access system already present in the vehicle to transmit a signal, which is measured by a long-wave receive unit of a tire electronic system and used to detect the position of the wheel on the vehicle. The electrical or magnetic field strength of the received signal in particular is detected for example and a position determination is carried out based on the position of the transmitting long-wave antenna on the vehicle.

One advantage of the invention is reliable and fast identification of a wheel position irrespective of specific drive maneuvers. The equipment outlay for left/right location of a wheel can also be reduced to a minimum, as no expensive antenna apparatus is required according to the invention. In a first embodiment in particular for example only one additional long-wave antenna may be required. In a particularly advantageous embodiment however such an additional long-wave antenna can be dispensed with completely, if such an additional long-wave antenna or a device that can also operate as a long-wave antenna is already present.

In particular an active access system or locking system in a motor vehicle, such as a passive start and entry (PASE) system marketed by Siemens VDO, already has at least one such long-wave antenna. In one very advantageous embodiment, the antennae used for the PASE system can also be used for the device according to the invention or the method according to the invention. In this case there is advantageously no need for an additional long-wave antenna.

The at least one long-wave antenna is preferably mounted in a door handle, inside a vehicle door, a fender, in the trunk, a side impact protection unit, an exterior mirror, a light unit or the A, B or C pillars of the vehicle.

In particular the evaluation unit can be configured to send a start signal to the control device on receipt of a message with tire status variables, in order to transmit the specific signal for the long-wave unit.

The control device can also be configured to transmit a plurality of signals in a predefined sequence via different long-wave antennae on receipt of the start signal.

In an alternative embodiment thereto, the control device can also be configured to transmit a plurality of signals in a predefined sequence via a single long-wave antenna on receipt of the start signal. A left/right location can thereby take place, which together with a front/rear location allows precise determination of the position of a wheel.

In a further advantageous embodiment, the tire electronic system is configured to enhance the receive response of the long-wave unit on transmission of a message with a tire status variable. This enhancement of the receive response can in particular be short-term or for a defined time. This is particularly advantageous in particular with regard to the energy consumption of the tire electronic system, as it avoids any unnecessary load on the energy supply in a wheel and prevents its limited energy resources being consumed unnecessarily quickly.

The tire electronic system is preferably configured to deduce the relative distance from the transmitting long-wave antenna according to the field strength of the received signal intended for the long-wave unit.

In a simple embodiment the tire electronic system is configured to sort a plurality of received signals according to their field strength.

Alternatively the tire electronic system can also be configured to compare each received signal with a predefined threshold value for field strength and to store the result of the comparison.

In a further embodiment, the tire electronic system can be configured to detect the wheel position based on the received signals and to transmit the detected wheel position by radio transmission to the evaluation unit.

Finally the evaluation unit can also be configured to detect the wheel position based on the messages from the tire electronic system.

The signal is then transmitted by the control device in particular via the at least one long-wave antenna of a vehicle access system present in the vehicle, when the control device receives a start signal from the evaluation unit, which the evaluation unit generates on receipt of a message from the tire electronic system with tire status variables.

To improve receipt of the transmitted signal, the tire electronic system can enhance the receive response of the long-wave unit, in particular for the short term or for a defined time, on transmission of a message with tire status variables.

In a preferred embodiment, the tire electronic system measures the field strength of the received signal and generates the response signal according to the measured field strength.

Alternatively the tire electronic system can also compare the field strength of the received signal with a threshold value and generate the response signal based on the result of the comparison.

Finally the tire electronic system can also sort received signals according to their measured field strength and generate the response signal based on the sorted received signals.

Other features which are considered as characteristic for the invention are set forth in the appended claims.

Although the invention is illustrated and described herein as embodied in a device and a method for determining a wheel position, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
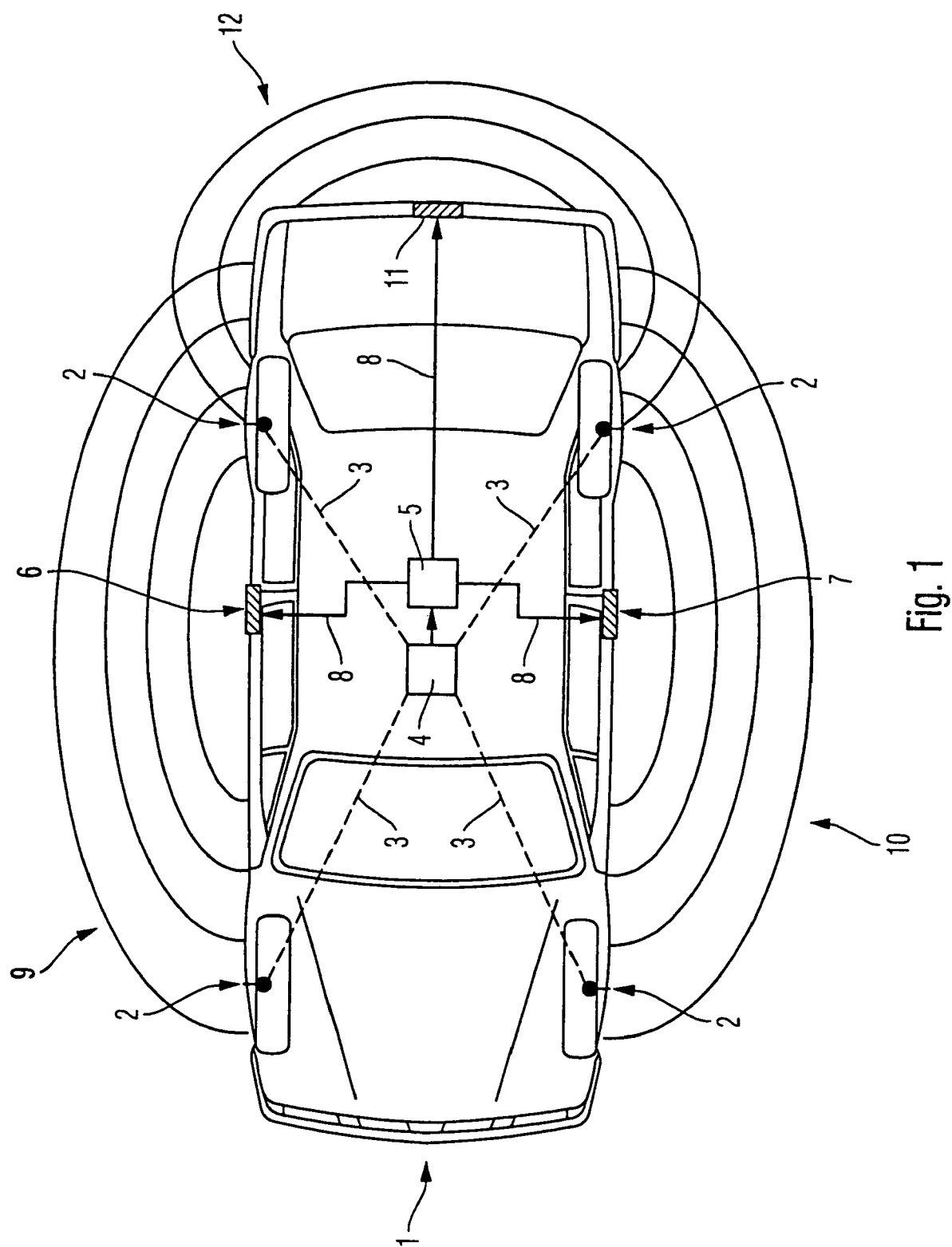
FIG. 1 is an illustration of an automobile, in which long-wave antennae mounted in the handles of the front doors can be used to determine the wheel position according to the invention.

In the figures in the drawing, unless otherwise specified, identical elements and signals or elements and signals with an identical function are assigned the same reference characters. The terms wheel electronic system and tire electronic system are used synonymously in the description that follows.

Referring now to the figures of the drawing in detail and first, particularly, to FIG. 1 thereof, there is shown an automobile 1, in which long-wave antennae 6, 7 and 11 of a passive vehicle access system are disposed. One long-wave antenna 6 is disposed in a handle of the front right door, one antenna 7 in the handle of a front left door and one antenna 11 in a rear fender of the automobile 1. Magnetic fields 9, 10, and 12 generated by the long-wave antennae 6, 7 and 11 are also shown in FIG. 1. The long-wave antennae 6, 7 and 11 are connected electrically to a control device 5 by signal lines 8. The control device 5 can transmit signals via the antennae. To this end it can activate individual antennae or even a plurality of antennae or all the antennae at once.

The transmission of signals by the control device 5 is controlled by an evaluation unit 4, which is disposed approximately in the center of the vehicle and is connected for communication purposes to the control device 5. The evaluation unit 4 contains a microprocessor and a storage unit and is configured to communicate via radio transmission links 3 with wheel or tire electronic systems 2 of the automobile wheels. In particular it receives messages from the tire electronic systems 2 about the current tire pressure of the corresponding vehicle tire for example. The other messages it receives, as described in more detail below, are messages that allow it to locate the wheels on the vehicle.

It is now explained how the position of a vehicle wheel can be determined using the invention. As already mentioned above, each wheel contains a tire electronic system 2, which is configured to acquire, i.e. measure, tire status variables such as tire pressure. A measured tire status variable can then be calibrated by the tire electronic system and transmitted wirelessly by radio 3 to the evaluation unit 4, which is permanently mounted in the vehicle 1. The transmitted data is provided with a unique identification code of the tire electronic system 2, to allow the evaluation unit 4 to assign the received data.

To detect a wheel position, the tire electronic system 2 measures a plurality of signals, which are emitted by the long-wave antennae 6, 7 and 11 mounted in the vehicle 1 in a specific time window and a specific sequence. To this end each tire electronic system 2 has a non-illustrated long-wave receive unit. As already mentioned, the long-wave antennae 6, 7 and 11 are actually provided to scan identifiers such as electronic radio keys for a passive vehicle access system inside and outside the vehicle. The antennae can for example be incorporated in door handles, in the rear fender, in the trunk, in the side impact protection unit, in the exterior mirror and/or in the A, B and/or C pillar of the vehicle. The long-wave antennae are connected electrically to the control device 5 and can be supplied by this with signals to be transmitted.

To receive the signals emitted by the long-wave antennae 6, 7 and 11 reliably in the wheel case, while at the same time only increasing the battery consumption of the tire electronic system 2 slightly, the long-wave receive unit of the wheel electronic system 2 can be switched to a higher response level for a short time, preferably during an in particular narrowly defined time window, in which the signals are transmitted by the long-wave antennae. Such a time window can for example start immediately after the tire electronic system 2 sends a message with tire status variables.

To this end the evaluation unit 4 sends a start signal at the start of the time window, for example on receipt of a message from a wheel electronic system 2, to the control device 5 connected to it, which in turn emits signals in a specific sequence via a plurality of long-wave antennae 6, 7 and 11.

Wheel position is then detected by evaluating the measured field strength of the long-wave signals received in the tire electronic system in that the relative distance from the transmitting antenna is deduced from the measured field strength of the received long-wave signal.

Exemplary embodiments of different methods for detecting the wheel position are described below.

In a first method the wheel position is calculated directly according to the known relationship between magnetic field strength and distance between the transmitter, i.e. long-wave antenna, and the receiver, i.e. tire electronic system.

In a second method the signals are sorted according to their field strength (and therefore their relative distance). This is described below with reference to an example. The long-wave signals are emitted by different long-wave antennae in a predefined sequence, e.g. by the antenna 7 incorporated in the left door, by the antenna 11 incorporated in the fender and finally by the antenna 6 incorporated in the right door. The wheel electronic system 2 at the front left tire then for example measures the following field strengths (in any units): 10, 1, 3. The tire electronic system 2 can use the measured field strengths to detect the position of the antennae, staggered according to distance in relation to the wheel electronic system: left door handle, right door handle, rear fender. The wheel electronic system is thereby uniquely assigned to the front left position. The tire electronic system can make such an assignment of the received signal field strength to the antenna, as the long-wave signals are for example emitted in a defined sequence. The tire electronic system can therefore make an assignment based on a time condition corresponding to the sequence.

It would also be possible for every signal emitted by an antenna to have a code identifying the emitting antenna or its position and an assignment to be made based on this code. This code can be predefined by the control device 5, which activates the antennae. The control device 5 can then in turn transmit the signals in coordination with the evaluation unit, which can trigger a position determination. Other embodiments of this method would of course also be possible as additions or alternatives.

In a third method a comparison is made with appropriate threshold values. An example of such an evaluation based on a threshold value is described below. "1" here means that a measured field strength is above the threshold value, "0" that it is below it. The long-wave signals are emitted in the antenna sequence "left door", "fender", "right door". The wheel electronic system of the wheel on the front left of the vehicle then obtains the following results for the comparison of the measured receive field strengths with the threshold value: 1, 0, 0. A result of the comparison by the wheel electronic system of the wheel on the rear left of the vehicle is: 1, 1, 0. The wheel electronic system of the wheel on the front right of the vehicle obtains this result for the comparison: 0, 0, 1; and the wheel electronic system of the wheel on the rear right of the vehicle the result: 0, 1, 1. Finally the wheel electronic system of the spare wheel obtains the result 0, 1, 0 or due to screening of the exterior antennae inside the vehicle 0, 0, 0. These results are transmitted by the respective wheel electronic systems 2 to the evaluation unit 4 in the vehicle to detect the wheel position. The wheel electronic systems 2 are then assigned to a wheel position by the evaluation unit 4. In this instance a wheel electronic system 2 itself does not require information about the sequence of signal emission by the long-wave antennae 6, 7, 11.

Two methods with which the evaluation unit can detect the wheel position are described below.

The field strengths of the long-wave signals measured by the tire electronic system 2 are transmitted to the evaluation unit 4 in the vehicle. The tire electronic system 2 is then assigned to a wheel position by the evaluation unit 4 either according to the first method for example (direct distance calculation) or according to the second method (sorting according to field strength). In this instance it is sufficient only to use one or two long-wave antennae, as the magnetic field decreases significantly with the distance between the transmitter and receiver.

The results of the comparisons are transmitted by the tire electronic system 2 to the evaluation unit 4, indicating which of the long-wave signals measured by the tire electronic system was above or below specific threshold values. The tire electronic system is then assigned to a wheel position for example by comparison of the binary patterns (see above) with expected values stored in a table.

In a simplified method, which advantageously also only requires a single long-wave antenna, the evaluation unit 4 can assign the wheel electronic systems 2 to a specific vehicle side (left or right, in the direction of travel) using the information received. In conjunction with known front/rear location methods this allows unique assignment of the wheel electronic systems to wheel positions. In this instance it is sufficient if the control device 5 emits a signal via a single long-wave antenna 6 or 7, for example an antenna for a vehicle access system incorporated in the left door handle. The wheel electronic systems on the side of the vehicle on which the long-wave antenna transmitted (on the left side in the example) measure a significantly higher field strength than those on the other side. It is therefore possible for the wheel electronic systems 2 or the evaluation unit 4 to make a unique left/right differentiation.

Figure 2:
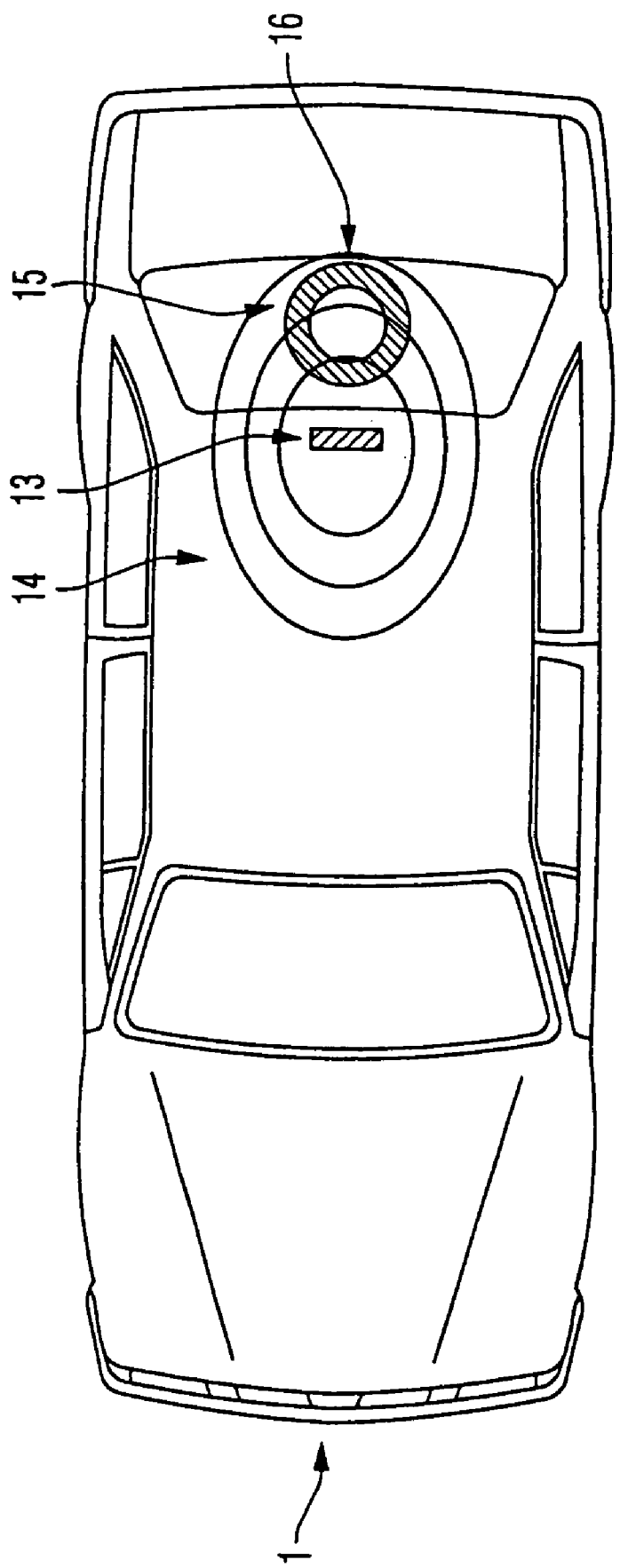
FIG. 2 is an illustration showing the position of a long-wave antenna mounted inside the automobile shown in FIG. 1 to determine the position of a spare wheel according to the invention.

Finally the wheel electronic system of a spare wheel can also be assigned reliably to an interior antenna by the signal. To this end the wheel electronic system of the spare wheel can measure the signals transmitted by a long-wave antenna mounted in the interior of the vehicle, in particular in the trunk. FIG. 2 shows an exemplary embodiment of such a configuration. An antenna 13 mounted in the interior of the vehicle in the region of the rear seat emits signals to determine the position of the spare wheel. Because the signals from interior antennae are not received or are only received very weakly by the other wheel electronic systems (see the magnetic field 14 of the interior antenna 13 in FIG. 2), unique assignment to the wheel electronic system 15 of the spare wheel 16 is possible. The interior antenna 13 will then transmit in a further time slot within the above-mentioned time window.

This application claims the priority, under 35 U.S.C. § 119, of German patent application No. 10 2004 032 698.3, filed Jul. 6, 2004; the entire disclosure of the prior application is herewith incorporated by reference.

We claim:

1. A device for determining a position of a wheel on a vehicle, the device comprising:
   an evaluation unit;
   a tire electronic system disposed on the wheel for measuring a tire status variable and wirelessly transmitting measured tire status variables to said evaluation unit, said tire electronic system having a long-wave receive unit and configured for enhancing a receive response of said long-wave receive unit for a predefined time window on transmission of a message with a tire status variable;
   at least one long-wave antenna of a vehicle access system disposed in the vehicle; and
   a control device provided in the vehicle and configured to activate at least one of said long-wave antenna, said control device being activated by said evaluation unit for transmitting a signal via said at least one long-wave antenna, the signal being intended for said long-wave receive unit in the wheel;
   said evaluation unit configured for sending a start signal to said control device on receipt of the message with the tire status variable, to transmit the signal intended for said long-wave receive unit;
   said long-wave receive unit configured to transmit a response signal wirelessly to said evaluation unit on receipt of the signal; and
   said evaluation unit configured for determining a position of the wheel of the vehicle based on the response signal.

2. The device according to claim 1, wherein said long-wave antenna is also a component of an active access system.

3. The device according to claim 1, wherein said long-wave antenna is mounted in a door handle, inside a vehicle door, a fender, in a trunk, in a side impact protection unit, in an exterior mirror, in a light unit or an A, B or C pillar of the vehicle.

4. The device according to claim 1, wherein said control device is configured to transmit a plurality of signals in a predefined sequence via different said long-wave antennae on receipt of the start signal.

5. The device according to claim 1, wherein said control device is configured to transmit a plurality of signals in a predefined sequence via a single said long-wave antenna on receipt of the start signal.

6. The device according to claim 1, wherein said tire electronic system is configured to deduce a relative distance from a transmitting antenna according to a field strength of the signal intended for said long-wave receive unit.

7. The device according to claim 6, wherein said tire electronic system is configured to sort a plurality of the signals received according to their field strength.

8. The device according to claim 6, wherein said tire electronic system is configured to compare the signal received with a predefined threshold value for a field strength and to store a result of a comparison.

9. The device according to claim 1, wherein said tire electronic system is configured to detect the position of the wheel based on received signals and to transmit the position of the wheel by radio transmission to said evaluation unit.

10. The device according to claim 1, wherein said evaluation unit is configured to detect the position of the wheel based on messages from said tire electronic system.

11. The device according to claim 2, wherein said active access system is a passive start and entry system.

12. A method for determining a position of a wheel on a vehicle, which comprises the steps of:
    transmitting a signal intended for a long-wave receive unit of a tire electronic system using at least one long-wave antenna present in the vehicle, a control device activating the transmitting of the signal when the control device receives a start signal from an evaluation unit, the evaluation unit generating the start signal on receipt of a message with a tire status variable from the tire electronic system, the tire electronic system enhancing a receive response of the long-wave receive unit for a predefined time window on transmission of the message with the tire status variable;
    generating a response signal from the signal received by the tire electronic system via the long-wave receive unit;
    transmitting the response signal to the evaluation unit; and
    detecting the position of the wheel on the vehicle by the evaluation unit based on the response signal.

13. The method according to claim 12, which further comprises:
    measuring a field strength of the signal received with the tire electronic system; and
    generating the response signal according to the field strength measured.

14. The method according to claim 13, which further comprises using the tire electronic system for comparing the field strength of the signal received with a threshold value and generating the response signal based on a result of a comparison.

15. The method according to claim 13, which further comprises using the tire electronic system for sorting received signals according to measured field strength and generating the response signal based on sorted received signals.

* * * * *